United States Patent Office 3,466,203
Patented Sept. 9, 1969

3,466,203
METHOD OF PRODUCING PURIFIED REFRACTORY METAL AND ALLOY POWDERS
Charles O. Tarr and Louis V. Owen, Cincinnati, Ohio, assignors to the United States of America as represented by the United States Atomic Energy Commission
No Drawing. Filed Apr. 25, 1967, Ser. No. 634,795
Int. Cl. C21d 1/74
U.S. Cl. 148—20.3      1 Claim

ABSTRACT OF THE DISCLOSURE

Porosity-free welds are produced from refractory metal powders which have been purified by leaching in dilute solutions of a mineral acid followed by heat treatment at elevated temperatures in a hydrogen atmosphere containing water vapor.

---

The invention described herein was made in the course of, or under, a contract with the U.S. Atomic Energy Commission.

BACKGROUND OF THE INVENTION

The present invention relates to a method of purifying refractory metal powders. More particularly it relates to and has for its principal object to provide a method of purifying refractory metal powders in order to improve the weldability of products made from such purified powders.

The use of powder metallurgy techniques to produce sheets, plates, bars, and tubes from refractory metals such as molybdenum, tungsten, rhenium, chromium, and alloys thereof (particularly with other refractory metals such as ruthenium, tantalum, hafnium, and niobium) has many advantages over arc casting and other melting procedures in terms of costs, yield of product, and improvement in high temperature properties. However, the weldability of parts fabricated by powder metallurgy techniques are generally recognized as being inferior to the quality of welds which can be made from parts produced by arc casting methods. The inferior quality of weldments made to and with parts fabricated from powder is generally not apparent to the naked eye. However, upon magnification these heat affected areas (i.e., in and around the weld) will show relatively large voids and pores which contribute to the brittle nature of the weld. It is clear then that the many advantages which accrue from manufacturing parts from powder metallurgy techniques are largely negated because of their poor weldability. The necessity for having sound crack-free and pore-free welded joints in refractory metals and alloys is particularly apparent with welded assemblies made from refractory metal and alloy components which frequently must withstand service temperatures of the order of 2000° C. under stringent stress and corroding environments such as are experienced in nuclear reactor and space applications.

The poor weldability of structures made from powder metallurgy fabrication processes has been generally attributable to the presence of trace impurities dissolved or sorbed on the surface of the powder. These trace impurities volatilize in the molten metal at welding temperatures and leave small pinholes, voids, or pores in the weld-fused metal or the heat affected areas of the base metal as the weld cools. In an effort to reduce the impurity level, it has become standard operational procedure to pretreat the powder prior to fabrication into structures by a high temperature purification exposure to a hydrogen atmosphere containing water vapor to reduce carbon content to less than 20 parts per million. This pretreatment is designed to oxidize any dissolved or occluded carbon to carbon monoxide or carbon dioxide, thus eliminating a source of weld porosity. Experience has shown that while the hydrogen-water vapor atmosphere improves the purity of powder derived products, it does not yield the absolute weld soundness required in constructing components and assemblies for nuclear or space applications.

SUMMARY OF THE INVENTION

The present invention is based on the discovery that weld porosity in welds made between parts derived from selected refractory metal powders can be virtually eliminated if the powders are leached with dilute aqueous solutions of selected mineral acids prior to treatment of compacts made from the acid leached powder in a hydrogen-water vapor atmosphere. In short, our invention lies in the discovery that refractory metal powders which are acid leached and subsequently exposed to a hydrogen atmosphere can be fabricated into weldable structures which exhibit substantially complete freedom from porosity in the weld or in the surrounding heat affected areas. A weldable structure in this sense is determined by an examination of X-ray photographs of the weld and heat affected areas. A satisfactory pore-free weld is deemed to have been obtained if no pores can be discerned along the line of the weld as observed through a magnifying glass which magnifies the line of the weld at least five times.

The improvement in weldability achieved by acid leaching will depend on the choice of acid leachant. For example, we have found that dilute solutions of nitric acid or hydrochloric acid, or mixtures of the two, will be effective to produce a weldable product if the leached powder is subsequently heat treated in a hydrogen-water vapor environment. On the other hand, dilute solutions of sulfuric acid or hydrofluoric acid will not result in improved weldability. Thus, the choice of acid leachant is both critical and completely surprising because while all of the aforementioned mineral acids would normally have been expected to dissolve metallic trace impurities with equal effectiveness they are not equivalent in terms of yielding a weldable product.

Example I

Prior to this invention molybdenum structures derived from or fabricated by powder metallurgical techniques were shown to develop considerable porosity in weld areas. It was thought that sound welds in molybdenum could only be obtained from cast structures. This example is designed to show that weldable molybdenum products can be derived from molybdenum powder.

A batch of molybdenum powder purchased from a commercial vendor was separated into four portions. The first portion was mixed with an aqueous solution of 0.001 M nitric acid; the second batch was mixed with 0.001 M hydrofluoric acid; the third with .001 M nitric acid; and the fourth sequentially treated with hydrochloric acid first, hydrofluoric acid second, and a final leach in nitric acid, all at room temperature. After about 10 minutes the leachant solutions were decanted and the respective wet powders were rinsed with distilled water, vacuum dried at room temperature and at a temperature in the range 180° F. to 300° F. for a period ranging from 12 to 16 hours. The dried powders were then cooled to room temperature, sieved, and compacted into a sheet or bar. The compacts were treated in a furnace with a flowing hydrogen-water vapor atmosphere at a temperature of 1000° C. for 350 hours. Dewpoint of the hydrogen was 5° C. The purpose of the wet hydrogen treatment was to reduce the carbon content by conversion to CO or $CO_2$. An additional heat treatment in dry hydrogen at 1400° C. was used to insure removal of any occluded oxygen in the compact. The compacts were then sintered at 2500° C. in a dry hydrogen atmosphere to near theoretical density. Then they were hot rolled in air to produce sheets having a thickness of approximately 40 mils. The resultant sheets were heat treated again in hydrogen to remove any oxygen sorbed on the surface during the hot rolling operation. And, finally, the sheets were cold rolled down to a thickness of 20 mils. A stress relieving anneal at 1400° C. in dry hydrogen concluded the sheet fabrication sequence. The cold rolled purified molybdenum sheets were cut into sections and electron-beam welds were applied in directions running both transverse and parallel to the axis of the rolling direction. The welded specimens were then X-rayed and positive photographic prints of the X-ray photographic negatives were then examined under a magnifying glass. The weld line appeared white against a black background of the base metal. Examination of the white areas along the weld line revealed that the specimens leached with hydrochloric acid or nitric acid were free of porosity. The specimens treated with hydrofluoric acid showed fairly extensive perforations, voids, or pores while the specimen which was leached with a mixture of HCl:HNO$_3$ and HF showed lesser amounts of porosity. Thus, it is shown that the hydrofluoric acid leach provides no benefit in terms of improved weldability and apparently nullifies the beneficial results achieved with hydrochloric acid and/or nitric acid.

In a manner similar to that shown in the representative example, other refractory metals and alloys can be processed to make weldable products from parts made by powder metallurgy. Among the alloys which can be rendered weldable sufficient to meet nuclear standards are alloys of tungsten, molybdenum, and rhenium; molybdenum and rhenium; and molybdenum and tungsten. The beneficial effects of the acid leach and hydrogen pretreatment will also be realized with unalloyed tungsten and rhenium.

Example II

The weldability and ductility of powder metallurgy molybdenum obtained from a commercial source, arc cast molybdenum sheet, and the powder metallurgy sheet derived from powder purified by the two-step (acid leach, HCl, + hydrogen treatment) purification sequence of Example I was tested. A comparison of the weldability and bend tests of the welded molybdenum sheets from the three sources is summarized in the following table.

TABLE—COMPARISON OF WELDABILITY AND BEND TESTS ON MOLYBDENUM SHEET FROM THREE SOURCES

| Material | Room-temperature bend tests [1] | | | Condition of welds |
| --- | --- | --- | --- | --- |
| | As received | After 2-hour heat treatment (2,400/ C.) | After welding | |
| Commercial powder-metallurgy sheet | 90° bends | 90° bends (fine-grained) | Not tested | Large blow holes (unweldable). |
| Commercial arc-cast sheet | do | Brittle [2] | Brittle | Excellent, no porosity. |
| Acid leached powder metallurgy sheet | do | 90° bends (fine-grained) | 45°–90° bends | Excellent, no porosity. |

[1] Bends conducted with a 2T radius punch.
[2] Coarsened to very large grains.

We have thus achieved a powder metallurgy derived product which is ductile at room temperature and a weldability equivalent to that obtained with arc cast materials.

We claim:

1. A method for rendering parts made from a refractory metal powder selected from the group consisting of molybdenum, tungsten, rhenium, and chromium, and alloys thereof weldable, which comprises leaching said powder with a dilute solution of an effective mineral acid selected from the group consisting of nitric acid and hydrochloric acid, washing and drying the leached powder, compacting the dried powder and then heating the compact in a hydrogen atmosphere under conditions which reduce the carbon and oxygen level in the compact to a level acceptable for welding purposes.

References Cited

UNITED STATES PATENTS

| 2,431,690 | 12/1947 | Hall et al. | 75—0.5 |
| 2,489,116 | 11/1949 | Young | 148—126 |
| 2,834,667 | 5/1958 | Rostron | 75—0.5 |
| 3,110,101 | 11/1963 | Kieffer et al. | 75—176 |

RICHARD O. DEAN, Primary Examiner

U.S. Cl. X.R.

75—0.5; 148—126, 133